US006985572B2

(12) United States Patent
Gosselin

(10) Patent No.: US 6,985,572 B2
(45) Date of Patent: Jan. 10, 2006

(54) DECODING AND PROCESSING SYSTEM FOR ADVANCED DETERMINATION AND DISPLAY OF CITY AND STATE CALLER INFORMATION

(75) Inventor: Mark Gosselin, Seattle, WA (US)

(73) Assignee: Cequint, Inc., Seattle, WA (US)

( * ) Notice: Subject to any disclaimer, the term of this patent is extended or adjusted under 35 U.S.C. 154(b) by 9 days.

(21) Appl. No.: 10/225,549

(22) Filed: Aug. 20, 2002

(65) Prior Publication Data

US 2004/0037413 A1    Feb. 26, 2004

(51) Int. Cl.
   *H04M 3/42*     (2006.01)
   *H04M 15/06*    (2006.01)
   *H04M 1/56*     (2006.01)
(52) U.S. Cl. .............................. 379/207.15; 379/142.1; 379/142.17; 379/142.06
(58) Field of Classification Search ........... 379/201.01, 379/201.04, 207.02, 207.15, 221.14, 142.01, 379/142.04, 142.06, 142.1, 142.17
See application file for complete search history.

(56) References Cited

U.S. PATENT DOCUMENTS

| 6,075,850 | A | * | 6/2000 | Ali et al. | 379/142.01 |
| 6,353,664 | B1 | * | 3/2002 | Cannon et al. | 379/142.1 |
| 6,366,670 | B1 | * | 4/2002 | Davis et al. | 379/387.01 |
| 6,714,639 | B1 | * | 3/2004 | Bedingfield et al. | 379/221.13 |

* cited by examiner

*Primary Examiner*—Benny Q. Tieu

(74) *Attorney, Agent, or Firm*—Frank Frisenda

(57) ABSTRACT

An improved decoding and processing system is provided for advanced determination and display of geographic information to a called party relating to the call origination party. The improved system comprises a receiving device to receive an MDMF or SDMF format message from a local CO switch containing call identification data; a microcontroller storage and retrieval device containing a data base library for selectively determining the corresponding geographic information such as city and/or state by matching the area code and/or local exchange number received from the call origination party; and a readout device for displaying the city and/or state of the incoming call. Preferably, the system includes capability to automatically update the data base library of the storage and retrieval device as new area codes and/or local exchanges are subsequently assigned. Accordingly, the improved system provides the user with convenient and efficient display of geographic information related to caller identification that is capable of determining an ever increasing number of area code and local telephone exchange numbers.

10 Claims, 1 Drawing Sheet

DECODING AND PROCESSING SYSTEM FOR ADVANCED DETERMINATION AND DISPLAY OF CITY AND STATE CALLER INFORMATION

BACKGROUND OF THE INVENTION

The present invention relates generally to the science of telecommunications. In more detail, the present invention relates to a system for providing advanced geographic information to a called party about the calling party and/or call origination party.

Presently, telephone systems have evolved to include limited standard identification information about the calling phone (calling number and/or ANI) and the phone that was called (dialed number). This information is primarily obtained from the telephone number from which the phone call was placed and the telephone number that was dialed by the caller. The telephone system has recognized these two numbers as basic information sources (for routing calls and for billing purposes for example) and has developed a system of standards for the data character fields these numbers are to fill. The following background information will better explain these standards of limited phone identification used today by the telephone system of the United States and as it applies to the international standards as well.

Automatic Number Identification

Automatic Number Identification (ANI) is a basic element of telephone calls transported throughout the public and private telephone-networks. For the North America Numbering Plan (NANP), it is currently 10 digits long. ANI is used extensively for: call routing, call billing, call tracking, and call identification.

Call Routing Based on ANI

Area Code Routing based on the calling phone number is a common feature found in most long distance telephone networks. Based on the calling party number (ANI) the call can be routed and/or receive special treatment by telephone switches, the phone network, and equipment. Some Interexchange Carriers (IXC's) (such as AT&T, MCI, Sprint, etc.) and Local Exchange Companies (LEC's) (such as Ameritech) provide many enhanced forms of call routing usually based on the first 3 or more ANI digit screening.

Call routing based on the first 3 ANI digits is usually referred to as Area Code Routing. For example, if the calling number ANI was 614/847-6161, then Area Code Routing would consider the "614" part of the ANI and route the Ohio originated call using the "614" as the broad geographic data element to start the routing routines and calculations, based on the routing rules and other factors (e.g., agents available, volume of calls, lines available, time of day, day of week, percent allocation, and other factors).

Call Routing based on more than the first 3 ANI digits allows for more geographic precision. Most ANI's have a geographic relationship. Bell Core publishes a LERG (Local Exchange Routing Guide) that gives the approximate longitude and latitude for the area code/exchange (as well as other data contained in the LERG) represented by the first 6 digits of the ANI. For example, for the calling number 614/847-6161 the "614-847" component has the geographic representation of Ohio and the metropolitan area of North Columbus/Worthington. The Area-Code-Exchange (NPA-NXX) Routing ability gives even greater routing definition for the calling party (ANI). If a caller to an 800 number with an ANI of "614/847-6161" was in need of being connected to a towing service, then the geographically closest towing service might be identified to handle the towing job (at a shorter travel time and possible lower cost).

Call Identification

One of the most wide spread and well-known uses of the caller's ANI is Caller ID (Caller Identification). The concept of Caller ID is to pass on to the recipient of the call the ANI of the caller before the call is answered. ANI has been a key component of ISDN (Integrated Services Digital Network) defined by the CCITT in the 1970's. The caller's ANI has traveled the phone network since the 1970's, if not earlier, in the form of two products:

1. 1-800 Access Type Service;
2. Integrated Services Digital Network (ISDN Service)

Many companies, business, and individuals use ISDN, digital access, and/or Caller ID to get the data elements of the call—one of which is caller ANI.

The ANI of the caller is preserved and passed on as the call passes through the Public Telephone Network (and usually the Private Telephone Network, if possible). For example, the caller ANI may traverse through the LEC, IXC, CAP (Competitive Access Provider), PBX, ACD, Agent and so forth, so the final recipient receives the caller's ANI (i.e., caller ID).

Many conventional caller ID devices display the incoming phone number, but very few people are able to geographically recognize every area code. In this respect, reference is made to U.S. Pat. Nos. 6,009,149, 6,137,870, and 6,298,122, which disclosures are hereby incorporated by this reference. Moreover, most caller ID users would not inherently know more than a few of the local exchanges and their corresponding cities.

With an ever increasing number of new area codes being used, those skilled in the art have recognized a significant need for an improved system for decoding and processing advanced determination and display of city and state caller information. The present invention fulfills these needs.

SUMMARY OF THE INVENTION

An improved decoding and processing system is provided for advanced determination and display of geographic information to a called party relating to the call origination party. The improved system comprises a receiving device to receive an MDMF or SDMF format message from a local central office (CO) switch containing call identification data; a microcontroller storage and retrieval device containing a data base library for selectively determining the corresponding geographic information such as city and state by matching the area code and/or local exchange number received from the call origination party; and a readout device for displaying the geographic information related to the incoming call. Preferably, the system includes capability to automatically update the data base library of the storage and retrieval device as new area codes and/or local exchanges are subsequently assigned. Accordingly, the improved system provides the user with convenient and efficient display of city and state caller identification that is capable of determining an ever increasing number of area code and local telephone exchange numbers.

Since the city and state information will be quite large it will be of interest to store it as efficiently as possible. This will also satisfy the need for quick searched.

It would be useful for the device to be able to update its database automatically, as new area codes and local exchanges will continue to be assigned. This may not be possible with low-costs Type I caller ID devices as they do not typically have off-hook circuits or dialing capability. However, Type II caller ID boxes have an off-hook circuit and dialing capability. The device can be programmed to call into a server at a periodic rate for updates. The data is then transferred from server to the device using the Caller ID boxes' FSK decoder.

DESCRIPTION OF THE PREFERRED EMBODIMENTS

An improved decoding and processing system is provided for advanced determination and display of geographic information to a called party relating to the call origination party. The improved system comprises a receiving device to receive an MDMF or SDMF format message from a local central office (CO) switch containing call identification data; a microcontroller storage and retrieval device containing a data base library for selectively determining the corresponding geographic information such as city and/or state by matching the area code and/or local exchange number received from the call origination party; and a readout device for displaying the city and state of the incoming call. Preferably, the system includes capability to automatically update the data base library of the storage and retrieval device as new area codes and/or local exchanges are subsequently assigned. Accordingly, the improved system provides the user with convenient and efficient display of geographic information related to caller identification that is capable of determining an ever increasing number of area code and local telephone exchange numbers.

Figure 1:
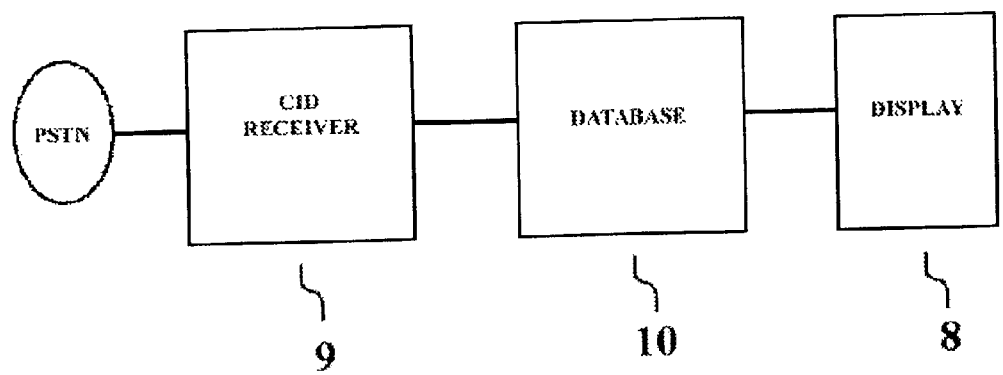
FIG. 1 is a schematic block diagram illustrating one embodied form of the present invention for advanced determination and display of geographic information relating to the call origination point.

Referring now to the drawings, FIG. 1 depicts one embodied form of the invention. The receiving means 9 receives a MDMF or SDMF format message from the local central office switch containing the call origination phone number. A data base storage means 10, for instance a microcontroller, then finds the corresponding geographic information such as city and/or state by matching the area code and/or local exchange number received from the call origination signal. Storage means 10 may be provided with internal or external memory. The storage means will generally be FLASH, EEPROM, or other non-volatile memory device that is re-writable for updates.

The North American Numbering Plan (NANFP) has 680 area codes available for use. Of these, currently over 40 area codes are used for other countries that participate in the NANP. In order to directly address all 680 area codes in memory with their corresponding local exchanges it would require a storage device of over 128 MB.

Since the microcontrollers generally used with Caller ID boxes are low-cost and therefore relatively slow, the City and States information is organized using a look-up table for fast searching.

| AREA CODE LOOK-UP TABLE | |
|---|---|
| Area Code | Memory Address |
| (10-bits) | (15-bits or greater, depending on memory size) |
| 000 | |
| 001 | |
| 206 | OB5h |
| 253 | OF8h |
| — | |
| 999 | |

Area codes that are currently undetermined may be added to any memory location. Currently undefined codes are left blank.

Since the city and state information will be quite large it will be of interest to store it as efficiently as possible. The state name is stored only once at the beginning of each area code table along with its abbreviation. The city name is also stored only once followed by its associated exchanges. Since the exchanges are generally not assigned sequentially for a given city, all exchanges must be listed separately. The exchange code 000 is used to indicate an end of record since the exchange doesn't actually exist in the NANP.

City, State, and Exchange Data as Organized in Memory:

| | |
|---|---|
| WA WASHINGTON | ; 70-bits (longest state name is Rhode Island |
| | ;         12 characters + 2 for abbreviation |
| | ;         = 14 characters * 5-bits) |
| SEATTLE | ; 90-bits (18 characters for city name * 5-bits) |
| 201 | ; 10-bits |
| 202 | |
| ... | |
| 998 | |
| 000 | |
| NORTH BEND | |
| 888 | |
| 000 | |

If the city and state information is not current, incoming call information may not match any of the entries in the memory. In the case of known area code but missing exchange, the state name will still be displayed. This also may be used for devices with smaller memories that don't include all of the minor exchanges.

It would be useful for the device to be able to update its database automatically, as new area codes and local exchanges will continue to be assigned. This may not be possible with low-costs Type I caller ID devices as they do not typically have off-hook circuits or dialing capability. However, Type II caller ID boxes have an off-hook circuit and dialing capability. The device can be programmed to call into a server at a periodic rate for updates. The data is then transferred from server to the device using the Caller ID boxes' FSK decoder.

Figure 2:
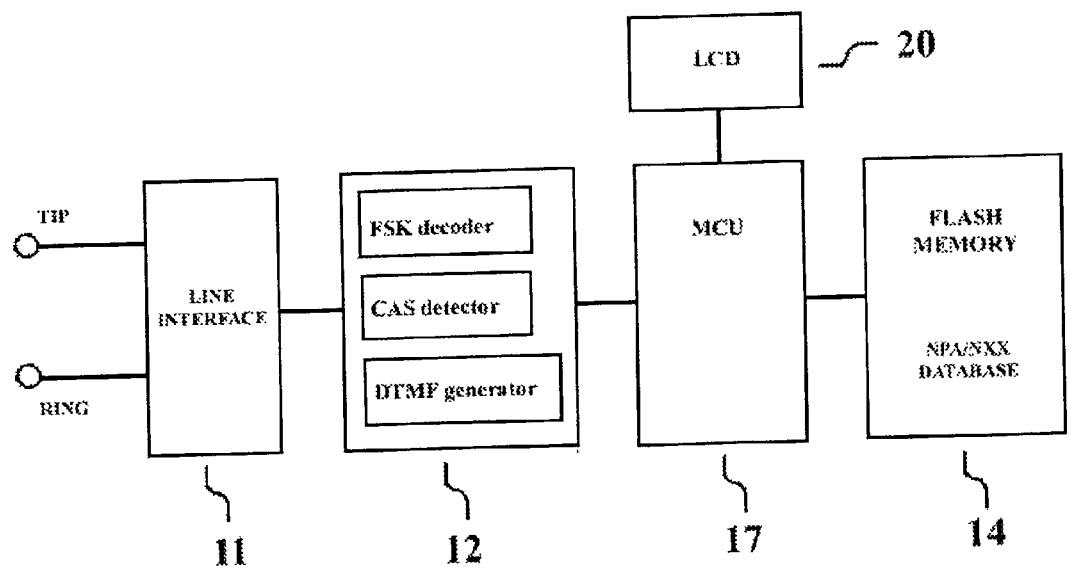
FIG. 2 is a schematic block diagram illustrating a second embodied form of the present invention including a flash memory component for storage of geographic information.

The following is an illustrative embodiment of the inventive system in FIG. 2.

In one embodiment, the receiving device 12 is a low power monolithic mixed signal CMOS integrated circuit, such as the Mitel 8843, for receiving physical layere FSK and CAS signals. For on-hook reception the device alerted by a ring or presence of the channel seizure detected by the FSK decoder. For off-hook reception, Bellcore's call alerting signal (CAS) is sensed by the integrated circuit's dual tone (2130 Hz and 2750 Hz) detector. In either case the FSK signal is decoded by a low-cost microcontroller, such as the Epson EOC6007, and the NPA is obtained. The microcontroller 17 then compares the first three digits of the NPA to the look-up table in the city and state database memory 14. Once the memory address for the corresponding area code is found a match can be made to the NXX to read the city data. The city and state data are then displayed on the LCD 20 with the other standard name and number caller ID information.

Receiving updates is only possible with devices capable of off-hook reception. The device uses the built in DTMF dialer of the 8843 to call a central server which contains the current city and state data. The server initiates the transfer using a CAS signal, which is acknowledged by device with a DTMF tone. The server then sends any updated area codes and exchanges which the device receives using its FSK decoder. The microcontroller then writes the database in memory with the updated NPA/NXX information.

I claim:

1. An improved decoding and processing system for advanced determination and display of geographic caller information, said system comprising:
   a receiving device to receive an MDMF or SDMF format message from a local CO switch containing call identification data from a call origination party;
   a microcontroller storage and retrieval device containing a data base library for selectively determining the corresponding geographic information of the call origination party by matching the area code and/or local exchange number received from the call origination party with geographic information derived from the data base library; said device comprising off- hook reception means for automatically updating the data base library with current information as new area codes and/or local exchanges are subsequently assigned; and
   a readout device for displaying the geographic information including a call data character stream related to the call origination party.

2. The improved system of claim 1 wherein the standard data field is a data field for a dialed number.

3. The improved system of claim 1 wherein the call data character stream replaces the contents of the standard data field.

4. The improved system of claim 1 wherein the call data character stream references information stored in a database.

5. The improved system of claim 1 wherein the call data character stream is used to process the voice path of the telephone call.

6. The improved system of claim 1 wherein the call geographic information is a city identification of the call origination party.

7. The improved system of claim 1 wherein the call geographic information is a state identification of the call origination party.

8. The improved decoding and processing system of claim 1 wherein said microcontroller storage and retrieval device comprises a built in DTMF dialer to communicate with a central server having current information for updating the data base with current corresponding geographic data.

9. The improved decoding and processing system of claim 8 wherein said central server initiates the transfer of current information for updating the data base using a CAS signal, which is acknowledged by said microcontroller device with a DTMF tone.

10. The improved decoding and processing system of claim 9 wherein said central server transmits updated current information to said microcontroller device that is received and interpreted using a FSK decoder.

* * * * *